United States Patent
McCorkendale et al.

(10) Patent No.: US 8,402,528 B1
(45) Date of Patent: Mar. 19, 2013

(54) PORTABLE FIREWALL ADAPTER

(75) Inventors: Bruce McCorkendale, Manhattan Beach, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 2431 days.

(21) Appl. No.: 10/914,861

(22) Filed: Aug. 9, 2004

(51) Int. Cl.
*G06F 9/00* (2006.01)
*G06F 15/16* (2006.01)
*G06F 17/00* (2006.01)

(52) U.S. Cl. .................................................. 726/11
(58) Field of Classification Search ................ 726/11
See application file for complete search history.

(56) References Cited

U.S. PATENT DOCUMENTS

| | | | | |
|---|---|---|---|---|
| 5,606,668 | A * | 2/1997 | Shwed | 726/13 |
| 7,051,365 | B1 * | 5/2006 | Bellovin | 726/11 |
| 2006/0230441 | A2 * | 10/2006 | Oliphant | 726/11 |
| 2006/0282887 | A1 * | 12/2006 | Trumper et al. | 726/11 |

OTHER PUBLICATIONS

Linksys, "USB VPN & Firewall Adapter," Published 2003, Instant Ethernet Series, pp. 1-2.*
ZyXel (total internet access solution), "Zywall 10, Internet Security Gateway," User's Guide, Version 3.24, Published Apr. 2001.*
Judge, 3Com Puts Firewall On A NIC, Apr. 25, 2002 [Retrieved Dec. 1, 2004], Retrieved from the Internet<URL: http://news.zdnet.co.uk/business/0,39020645,2109150,00.htm.
New Products: SnapGear Debuts VPN Firewall-On-A-NIC, Mar. 18, 2003 [Retrieved Dec. 1, 2004], Retrieved from the Internet<URL: http://www.tomsnetworking.com/News_story_152.php.
Dual Speed Ethernet Adapter [Retrieved Dec. 1, 2004], Retrieved from the Internet<URL: http://www.dlink.com/products/?model=DSB-650TX.

* cited by examiner

*Primary Examiner* — William Powers
*Assistant Examiner* — Dant Shaifer Harriman
(74) *Attorney, Agent, or Firm* — Fenwick & West LLP

(57) ABSTRACT

A computer is especially vulnerable when connected to a network while software on the computer is in an unpatched state. A portable firewall adapter is installed inline between the computer having the unpatched software and a network. A firewall within the adapter enforces a security policy that protects the computer from attack via the network. The adapter allows the computer to be connected to the network in order to download patches and/or other software that cure the vulnerabilities on the computer.

23 Claims, 3 Drawing Sheets

PORTABLE FIREWALL ADAPTER

BACKGROUND OF THE INVENTION

1. Field of the Invention

This invention pertains in general to computer networking and security, and in particular to a firewall for protecting a computer from network-based attacks.

2. Description of the Related Art

The networked computing environment is wrought with constant threat. The threats are especially severe for new computers. A new computer typically includes the unpatched version (often referred to as the "shipped build") of its operating system and/or other software. The shipped build of the operating system is often riddled with vulnerabilities that have been discovered since the operating system was shipped. These vulnerabilities can be resolved by downloading and installing the appropriate patches from the Internet. Therefore, one of the first tasks performed by a person installing a new computer is to connect the computer to a network in order to patch the operating system and/or other software.

The prevalence and spread rate of modern computer worms and other malicious software is so great that new computers are infected almost immediately upon being connected to a network. This problem is especially severe when an unpatched computer is connected directly to the Internet. However, even computers connected to a supposedly secure network can be infected by other, already-infected, computers on the "safe" side of the network. As a result, if one connects a computer having a shipped build of its operating system to almost any network, it is more likely than not that the computer will be infected before one can install patches or security software.

What is needed, therefore, is a form of protection for the computer for the period where one is connecting it to a network in order to install and patch vulnerable software.

BRIEF SUMMARY OF THE INVENTION

The above need is met by a portable firewall adapter that allows the computer to be safely connected to the network in order to download patches for the vulnerabilities in the software. The portable firewall adapter is installed inline between the computer having the unpatched software and the network. A firewall within the adapter enforces a security policy that protects the computer from attack via the network yet allows the computer to obtain patches and/or other software.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
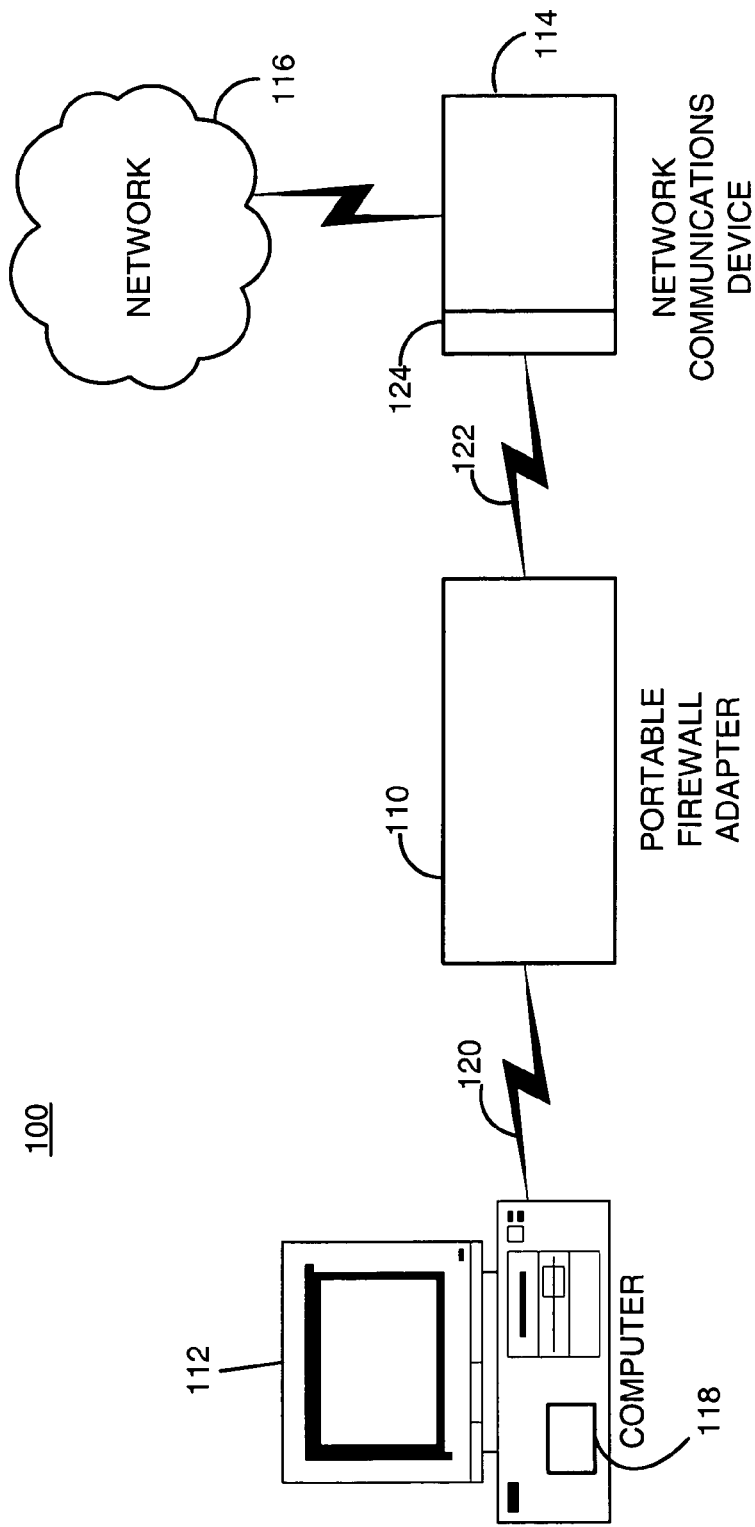
FIG. 1 is a high-level block diagram of an environment using a portable network adapter according to an embodiment of the present invention.

FIG. 1 is a high-level block diagram of an environment 100 using a portable network adapter 110 according to an embodiment of the present invention. In the illustrated environment 100, the portable firewall adapter 110 is installed inline between a computer 112 and a network communications device 114. The network communications device 114 is coupled to a network 116.

In one embodiment, the computer 112 is a standard personal computer such as an IBM PC or APPLE-compatible computer. In alternative embodiments, the computer 112 is a different type of electronic device having network connectivity, such as an Internet-enabled television or set-top box, a personal digital assistant (PDA), a networked consumer appliance, etc. As used herein, the term "computer" is intended to encompass both a standard personal computer and other types of electronic devices having network connectivity.

In one embodiment, the computer 112 includes a persistent storage, such as a hard drive, compact disk read-only memory (CD ROM), DVD, and/or firmware that stores software for execution by the computer. The executable software typically includes an operating system and application programs. In one embodiment, possible operating systems include MICROSOFT WINDOWS XP, APPLE OS X, LINUX, and variations thereof. Application programs can enable a wide variety of tasks to be performed on the computer 112, including, for example, word processing, sending and receiving email, browsing the World Wide Web, etc. As is known in the art, the operating system is usually loaded into random access memory (RAM) or another working memory when the computer is booted, and serves to control the operation of the computer system and any application programs being executed on it.

Often, the operating system that is distributed with a new computer is an early version. There are typically numerous patches (i.e., software updates) for the operating system available for download via the Internet or another network. The same is true of many application programs available for purchase by consumers. The store-bought version of the application program is the first publicly-available version of the application program and there are patches available on the Internet. Therefore, upon installation of the computer 112 and/or software onto the computer, a prudent end-user will connect to a network in order to patch the software. In some embodiments, this patching process is performed automatically by software executing on the computer.

The computer 112 is vulnerable to attack in the period while it is connected to the network 116 and before the software is patched. The initial version of the MICROSOFT WINDOWS XP operating system, for example, has a large number of vulnerabilities that are corrected by downloadable patches. There are many different types of malicious software that can rapidly identify an unpatched WINDOWS XP computer and exploit the vulnerabilities to compromise the computer. A computer worm is a type of malicious software that can exploit a vulnerability, install itself on the computer 112, and use the infected computer as a platform from which to launch attacks on other networked computers. Other types of malicious software that can exploit vulnerabilities on unpatched computer systems include Trojan horse programs and computer viruses.

In order to connect to the network 116, the computer 112 includes a network interface 118. In one embodiment, the network interface 118 includes a female Ethernet i.e., RJ-45) interface. In other embodiments, the network interface 106 takes other forms, such as a female Universal Serial Bus (USB) interface and/or IEEE 1394 ("Firewire") interface, male versions of these interfaces, a wireless interface, and/or another type of interface adapted to enable communications via the network 116.

A computer/adapter communications link 120 connects the computer to the portable firewall adapter 110. Similarly, an adapter/communications device communications link 122 connects the portable firewall adapter 110 to the network communications device 114. As will be described in more detail below, the adapter 110 monitors communications between the computer 112 and the network 116 and blocks potentially malicious communications. In one embodiment, the adapter 110 limits communications between the computer 112 and network 116 to the minimum utilized to install patches and/or other updates to the operating system and/or other software executing on the computer 112. The adapter 110 does not require any drivers and/or other specialized software to be installed on the computer 112. Thus, the adapter 110 can be utilized to protect the computer 112 during the critical phase when the computer is obtaining patches.

The network communications device 114 allows the computer 112, via the portable firewall adapter 110, to communicate with the network 116. In one embodiment, the network communications device 114 includes a router that routes data between the computer 112 and other computers on the network 116. In another embodiment, the network communications device 114 is a modem or other device that lacks routing capability. The network communications device 114 can be, for example, a switch or router coupling a local area network (LAN) to another LAN or a wide area network (WAN) such as the Internet, a digital subscriber line (DSL) or cable modem, or another device having equivalent functionality.

As with the computer 112, in one embodiment the network communications device 114 includes a network interface 124 for exchanging communications with the adapter 110. In one embodiment, the network interface 118 includes a female Ethernet i.e., RJ-45) interface. In other embodiments, the network interface 106 takes other forms, such as a female Universal Serial Bus (USB) interface and/or IEEE 1394 ("Firewire") interface, male versions of these interfaces, a wireless interface, and/or another type of interface adapted to enable communications via the network 116. The network communications device 114 also includes a network interface (not shown) for communicating with the network 116.

The network 116 allows the computer 112 to engage in data communications with other computers. In one embodiment, the network 116 is the Internet. The network 116 can also utilize dedicated or private communications links that are not necessarily part of the Internet. In one embodiment, the network 116 uses standard communications technologies and/or protocols. Thus, the network 116 can include links using technologies such as Ethernet, 802.11, integrated services digital network (ISDN), digital subscriber line (DSL), asynchronous transfer mode (ATM), etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 116 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
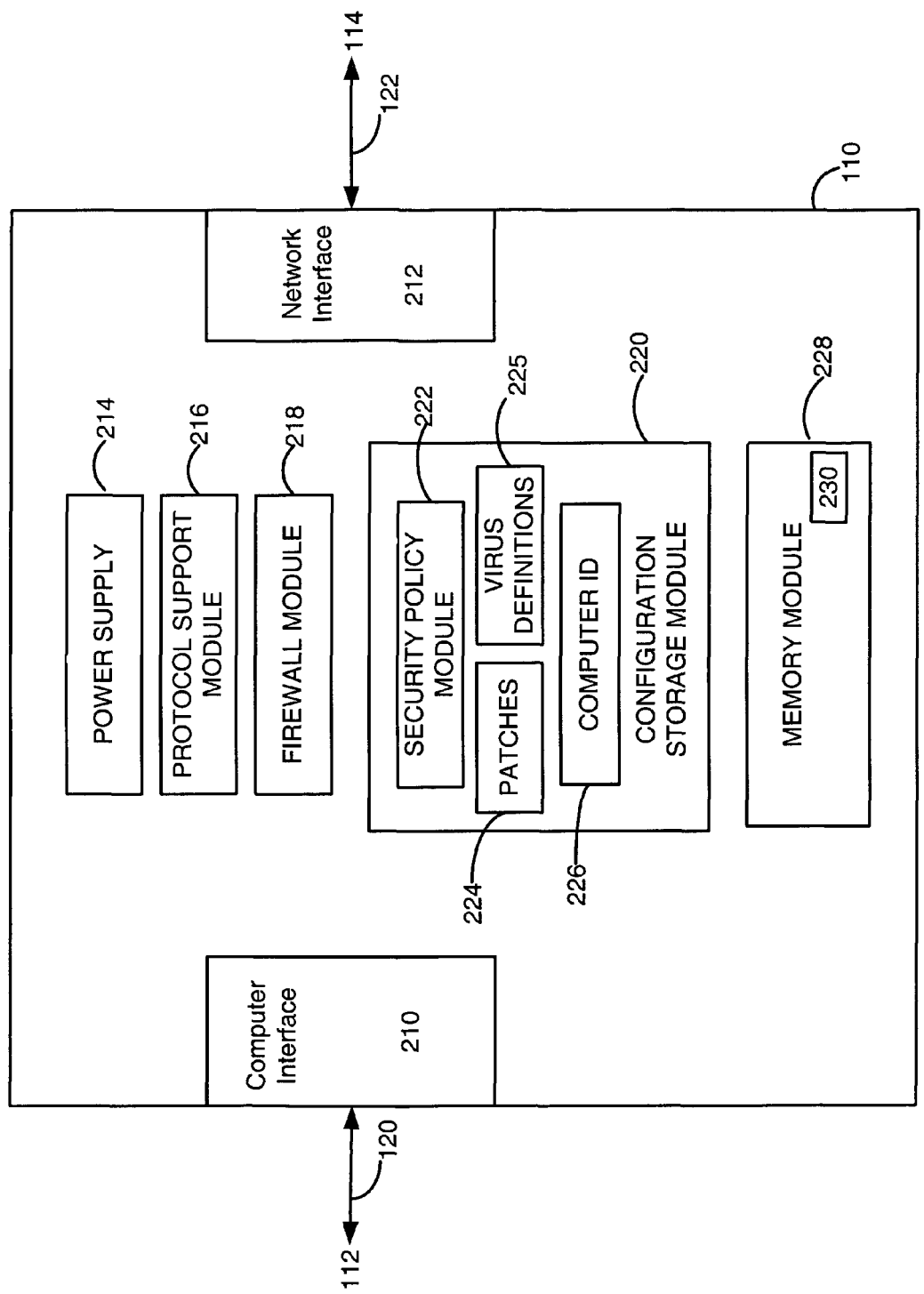
FIG. 2 is a block diagram showing details of the portable firewall adapter of FIG. 1.

FIG. 2 is a block diagram showing details of the portable firewall adapter 110 of FIG. 1. As shown in FIG. 2, the adapter 110 includes a number of different modules. As used herein, the term "module" refers to circuitry, computer program logic, and/or data for providing the specified functionality. A module can be implemented in hardware, firmware, and/or software. Embodiments of the portable firewall adapter 110 can include additional and/or different modules than the ones described herein. Moreover, the functionalities can be distributed among the modules in a manner different than described herein.

In one embodiment, the portable firewall adapter 110 includes an application-specific integrated circuit (ASIC) that performs all or some of the functionality described herein. An ASIC is relatively easy to build and inexpensive to produce, and has a small form factor. These qualities are desirable for the portable firewall adapter 110. In one embodiment, the portable firewall adapter 110 is packaged with a device or devices that provide additional functionality. For example, the adapter 110 can be included with a USB-Ethernet adapter and/or installed on a wired or wireless PCMCIA card.

The portable firewall adapter 110 includes a computer interface 210 for interfacing with the first communications link 120 that can be connected to the computer 112. The computer interface 210 allows network traffic to be exchanged between the computer 112 and the adapter 110. In one embodiment, the computer interface 210 includes a female Ethernet (i.e., RJ-45) interface. In other embodiments, the computer interface 210 takes other forms, such as a female Universal Serial Bus (USB) interface and/or IEEE 1394 ("Firewire") interface, male versions of these interfaces, a wireless interface, and/or another type of interface adapted to enable communications.

In one embodiment, the first communications link 120 is permanently mated with the computer interface 210 in order to increase the utility of the adapter 110. In this embodiment, the first communications link 120 includes a suitable interface for connecting to the computer 112 at the end opposite the portable firewall adapter 110. For example, in one embodiment the first communications link 108 is a cable permanently mated at one end to the computer interface module 210 and having at the other end a male Ethernet, USB, and/or IEEE 1394 interface that can be connected to a suitable female interface at the computer.

In a similar fashion, in one embodiment the portable firewall adapter 110 includes a network interface 212 for interfacing with the second communications link 122 that can be connected to the network communications device 114. The network interface 212 allows network traffic to be exchanged between the adapter 110 and the network 116 via the network communications device 114. In one embodiment, the network interface 212 includes one or more of the same types of interfaces as the computer interface 210, although the network and computer interfaces are not necessarily, of the same type. For example, in one embodiment the computer interface 210 includes a male USB interface while the network interface 212 includes a female Ethernet/RJ-45 interface. In addition, in one embodiment the second communications link 122 is permanently mated to the network interface 212.

In one embodiment, the portable firewall adapter 110 includes a power supply 214 that supplies electricity to the adapter. Depending upon the embodiment, the power supply 214 can use one or more of a variety of techniques to draw power. In one embodiment, the power supply 214 draws power from the computer 112 via the computer interface 210. For example, the power supply 214 can use the computer interface 210 to draw power from the computer's USB and/or IEEE 1394 interface. Likewise, in one embodiment the power supply 214 uses the computer interface 210 to draw power directly from the computer's Ethernet interface. In another embodiment, the power supply 214 draws power from the computer's keyboard connector and/or another source associated with the computer 112. In still another embodiment, the power supply 214 draws power from a battery installed within the adapter 110. In yet another embodiment, the power supply 214 draws power from an external power supply such as a AC adapter coupled to a power outlet.

In one embodiment, the portable firewall adapter 110 includes a protocol support module 216 for enabling the adapter 110 to interpret network traffic flowing between the computer 112 and the network 116. In one embodiment, the protocol support module 216 includes logic for interpreting common types of network traffic, including TCP and/or UDP packets. Likewise, in one embodiment the protocol support module 216 includes logic for interpreting common networking protocols utilizing TCP and/or UDP, including the Dynamic Host Configuration Protocol (DHCP), Domain Name Service (DNS), and/or HTTP. These protocols utilize various "ports," which are logical connection places on the computer 112.

Depending upon the embodiment, the protocol support module 216 also supports active and/or passive FTP. Both types of FTP utilize two communications channels: a command channel and a data channel. In passive FTP, both channels are opened by the client (i.e., the entity initiating the FTP connection). In active FTP, the command channel is opened by the client, but the data channel is opened by the server.

In one embodiment, the portable firewall adapter 110 includes a firewall module 218 for enforcing a security policy on the communications traffic flowing between the computer 112 and the network 116. In general, the firewall module 218 protects the computer 112 from network-based attacks by malicious software and/or other sources. In one embodiment, the firewall module 218 controls what resources on the network 116 the computer 112 can access, and/or controls what resources at the computer entities on the network can access.

In one embodiment, the portable firewall adapter 110 includes a configuration storage module 220 for storing configuration information utilized by the adapter. In one embodiment, the configuration storage module 220 includes a flash memory and/or other form of persistent memory that retains the configuration information when the adapter 110 lacks power. In another embodiment, the configuration storage module 220 retains the configuration information because it is powered by a battery. In one embodiment, data within the configuration storage module 220 can be updated via the computer 210 and/or network 212 interface.

The configuration storage module 220 includes a security policy module 222 that holds security policies that can be enforced by the firewall module 218. In one embodiment, a security policy allows the computer 112 to connect to the network 116 to perform a set of tasks, such as downloading patches for software on the computer, but is relatively restrictive in order to prevent malicious software on the network from exploiting a vulnerability on the computer 112. In one embodiment, the security policy allows all outgoing connections established by the computer 112 to pass through to the network 116, and also allows corresponding inbound responses from the network to reach the computer, but denies all other inbound connection requests from the network. As described in reference to the protocol support module 216, in one embodiment the outbound connections and/or protocols supported include DHCP, DNS, HTTP, and/or FTP.

In one embodiment, a security policy allows all outgoing and incoming communications to/from the computer 112, but blocks connections to incoming ports that are designated as "highly-susceptible to attack." In one embodiment, such highly-susceptible ports include the ports used for Windows File Sharing and/or the ports used for Windows remote procedure calls (RPCs). In one embodiment, TCP ports 139 and 445 and UDP ports 137, 138, and 445 are blocked to prohibit Windows File Sharing. In one embodiment, TCP ports 135, 139, 445, and 593 and UDP ports 135, 137, 138, and 445 are blocked to prohibit Windows RPCs.

In one embodiment, a security policy includes a list of allowed network addresses. This security policy allows the computer 112 to access only the allowed network addresses and blocks attempts to access other addresses. For example, the security policy can block the computer 112 from accessing any network addresses other than those utilized to patch the operating system and/or other software on the computer (e.g. block all web sites except "http://windowsupdate.microsoft.com"). In one embodiment, the security policy includes a list of blocked network addresses in addition to, or instead of, the list of allowed addresses.

In one embodiment, the security policy module 222 includes multiple security policies that it can apply to different computers 112 with which the adapter 110 is utilized. In addition, the security policy module 222 enforces a compliance policy that specifies which security policy is applied to a given computer 112 and/or at a given time. For example, the compliance policy can apply a restrictive security policy to a computer 112 that has not yet been patched, and a second, less restrictive, security policy to a computer that has been patched. In this example, the compliance policy allows the adapter 110 to be utilized to patch multiple computers. The adapter 110 can also be left in place on a single computer 112 after that computer has been patched and allow relatively unrestricted network 116 access for that computer.

In one embodiment, the configuration storage module 220 includes a patches module 224 for storing patches and/or other updates for software commonly found on computers 112. These patches are downloaded from the adapter 110 to the computer 112 and thus allow the computer to be patched without being connected to the network 116. In this embodiment, the adapter 110 includes logic in the protocol support module 216, firewall module 218, and/or elsewhere to provide an end-user of the computer 112 with a menu that allows the user to select given patches and cause them to be applied to the computer 112. In another embodiment, the logic in the adapter 110 recognizes that the computer 112 is in an unpatched state and causes one or more patches to be automatically applied to the computer 112.

In one embodiment, the configuration storage module 220 includes a virus definitions module 225 storing a set of virus definitions for use with antivirus software at the computer 112. In one embodiment, the virus definitions module 225 also includes the antivirus software that utilizes the virus definitions, such as NORTON ANTIVIRUS available from Symantec Corporation of Cupertino, Calif. The virus definitions and/or software can be downloaded from the adapter to the computer 112 in the same manner as the patches in the patches module 224.

In one embodiment, the configuration storage module 220 includes logic for interfacing with servers on the network 116 and downloading software patches into the patches module 224 and/or virus definitions into the virus definitions module 225. These patches/virus definitions can then be downloaded from the adapter 110 to the computer 112. In one embodiment, the security policy module 222 includes a security policy that blocks all network access by the computer 112. The firewall module 218 enforces this security policy until the software on the computer 112 has been patched and/or the computer's virus definitions are updated using the patches/virus definitions downloaded by the adapter 110.

In one embodiment, the configuration storage module 220 includes a computer identification (ID) module 226 for storing unique IDs identifying computers 112 with which the adapter 110 is and/or has been utilized. In one embodiment, the computer ID module 226 records the Media Access Control (MAC) addresses of every computer with which the adapter is used. The MAC address is a number that uniquely identifies the computer 112 and/or its network interface 118. Other modules within the adapter 110 utilize the information within the computer ID module 226 to identify specific computers 112 and/or recognize whether the adapter has been previously connected to a given computer. For example, the security policy module 222 can use the information in the computer ID module 226 to apply different security policies to different computers.

In one embodiment, the portable firewall adapter 110 includes a memory module 228 for holding data used during operation of the adapter. In one embodiment, the memory module 228 includes a random access memory (RAM) and/or other non-persistent memory. In another embodiment, the memory module 228 includes persistent memory. In one embodiment, the memory module 228 stores state tables 230 utilized by the firewall module 218 to track and associate packets sent between the computer 112 and other entities on the network 116. Other modules within the adapter 110 similarly use the memory module 228 to hold state and/or other types of information as may be necessary or desired.

Figure 3:
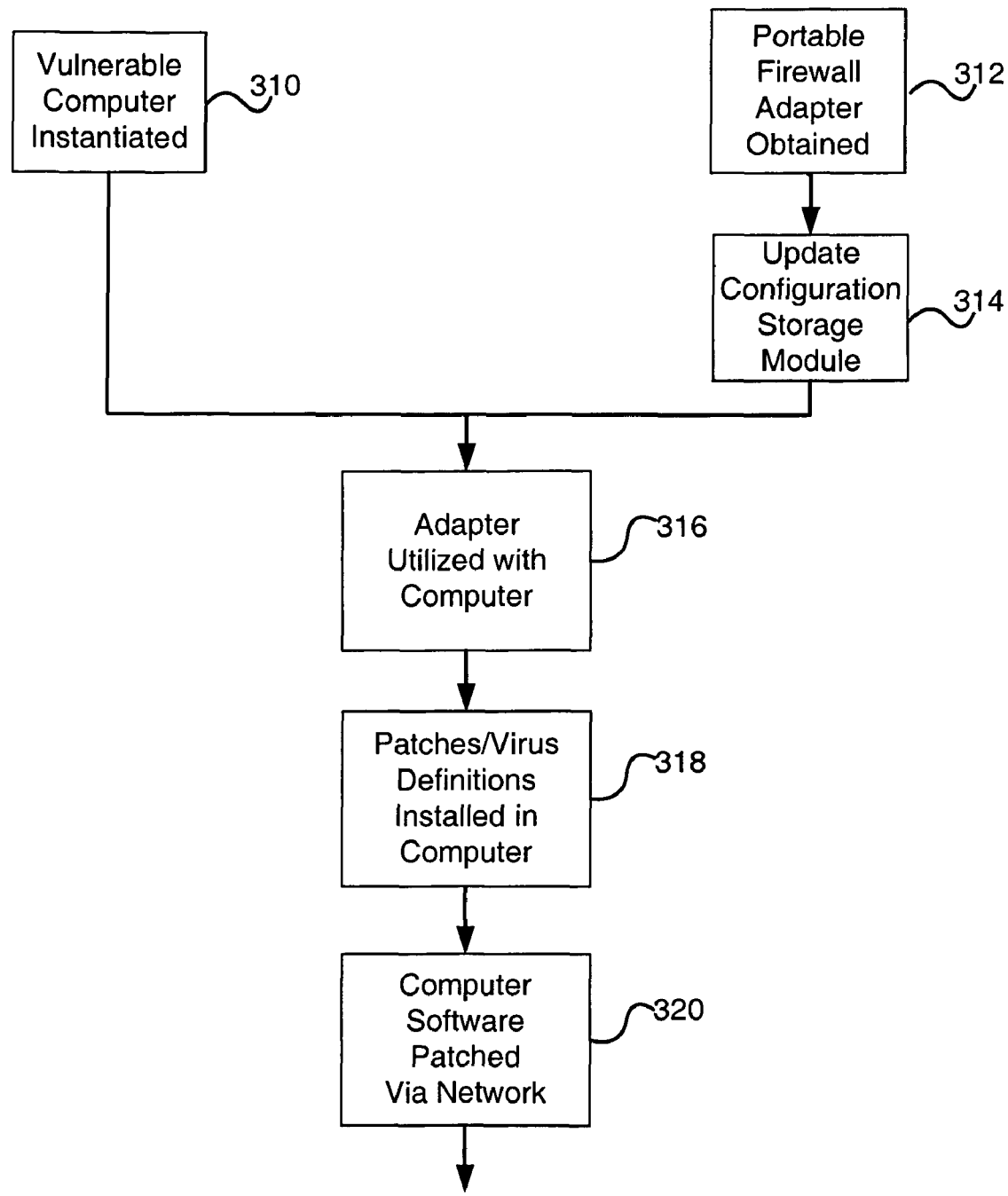
FIG. 3 is a flow chart illustrating a typical use of the portable firewall adapter according to one embodiment.

FIG. 3 is a flow chart illustrating a typical use of the portable firewall adapter 110 according to one embodiment. The portable firewall adapter 110 has many uses, some of which do not necessarily include the steps illustrated in FIG. 3 and/or include additional steps not shown in the figure. Thus, embodiments of the portable firewall adapter 110 can be used in a different manner than described herein.

At some point, a vulnerable computer is instantiated 310. This instantiation 310 can occur, for example, when an end-user obtains a new computer system and sets it up for the first time. The instantiation 310 can also occur when the end-user installs a new or replacement operating system on the computer 112. Similarly, the instantiation 310 can occur when the end-user installs a new application program on the computer 112. In each of these cases, the computer 110 and/or software on the computer is placed into a state when it is particularly vulnerable to attacks from malicious software on the network 116.

At some point not necessarily contemporaneous with the instantiation 310 of the vulnerable computer, the end-user and/or another entity obtains 312 a portable firewall adapter 110. For example, the adapter 110 can be included with a new computer, the end-user can purchase the adapter from a retail store or site on the Internet, or the end-user can locate an adapter that was previously used with the same, or a different computer 112.

In one embodiment, the configuration storage module 220 in the portable network adapter 110 is updated 314 at approximately the same time the adapter is obtained by the end-user. For example, the seller of the adapter can update 314 the information in the patches 224 and/or virus definitions 225 modules at the time of purchase by the end-user. Similarly, the end-user can update 314 the information in the modules using a kiosk or other device at the retail location or elsewhere. In another embodiment, the information in the configuration storage module is established at an earlier time, such as when the adapter 110 is manufactured and/or when the adapter is shipped by a distributor. In yet another embodiment, the information in the configuration storage module is established at a later time, such as when the adapter 110 is connected to the network 116 by the end-user.

The end-user utilizes 316 the portable firewall adapter 110 with the computer 112. As described above, the adapter 110 is installed inline between the computer 112 and the network 116. In one embodiment, the adapter 110 obtains and stores the patches and/or virus definitions within the configuration storage module 220 at this time. The patches and/or virus definitions are downloaded and installed 318 into the computer 112. This step can occur, for example, when the end-user views a menu presented by the adapter 110 that allows the end-user to select a menu option that causes the patches and/or virus definitions to be downloaded. In another embodiment, the installation occurs automatically.

The computer 112 connects to another computer on the network 116 to download patches for the operating system and/or other software. While the computer is connected to the network and before the patches are applied, the portable firewall adapter 110 prevents malicious software on the network 116 from exploiting the vulnerabilities on the computer 112. Once the patches are applied 320 to the software on the computer 112, the end-user removes the adapter 110 from its position inline between the computer 112 and the network 116. Alternatively, the end-user can leave the adapter in place.

In other embodiments, the portable firewall adapter 110 can be utilized in situations other than for patching a computer 112. For example, an end-user can install the adapter 110 inline between the computer 112 and the network 116 when the computer is located in a potentially-hostile computing environment, such as a hotel room.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A portable firewall adapter comprising:
    interfaces for enabling network traffic between a computer and a network;
    a memory embedded within the portable firewall adapter comprising a configuration storage module for storing a plurality of security policies for protecting the computer from attack by malicious software on the network, the configuration storage module comprising a patches storage module for locally storing update patches, wherein the portable firewall adapter is adapted to interact with the computer to install the update patches onto the computer prior to the computer connecting to the network; and
    a firewall module embedded within the portable firewall adapter for enforcing a given security policy stored by the configuration module to allow network traffic that enables the computer to obtain the update patches and to restrict other network traffic.

2. The portable firewall adapter of claim 1, wherein a security policy stored by the configuration storage module specifies a list of allowed network locations providing the update patches, and wherein the portable firewall module allows the computer to connect to only the allowed network locations in the list.

3. The portable firewall adapter of claim 1, wherein the configuration storage module is adapted to communicate with the network to obtain the update patches for software and store the update patches in the patches storage module.

4. The portable firewall adapter of claim 1, wherein the configuration storage module further comprises:
  a virus definitions storage module embedded within the portable firewall adapter for storing definitions identifying computer viruses, wherein the portable firewall adapter is adapted to interact with the computer to install the virus definitions onto the computer and wherein anti-virus software on the computer is adapted to utilize the virus definitions to detect computer viruses.

5. The portable firewall adapter of claim 4, wherein the configuration storage module is adapted to communicate with the network to obtain the virus definitions identifying computer viruses and store the virus definitions in the virus definitions storage module.

6. The portable firewall adapter of claim 1, further comprising:
  a computer ID storage module for storing identifiers associated with computers with which the portable firewall adapter is used.

7. The portable firewall adapter of claim 6, wherein the firewall module enforces a security policy selected from among the plurality of security policies stored by the configuration storage module responsive to an identifier of the computer.

8. The portable firewall adapter of claim 1, further comprising:
  a power supply adapted to draw power from the computer interface to power the portable firewall adapter.

9. The portable firewall adapter of claim 1, wherein the interfaces comprises:
  a computer interface permanently mated to the portable firewall adapter for directly coupling to an interface of the computer; and
  a network interface for coupling to the network.

10. The portable firewall adapter of claim 9, wherein the computer interface comprises a USB interface adapted to directly interface to a USB port on the computer.

11. The portable firewall adapter of claim 1, wherein the patches storage module automatically installs the update patches to the computer when the portable firewall adapter is connected to an unpatched computer.

12. A method of protecting a computer from a network-based attack, comprising:
  providing a portable firewall adapter adapted for installation between a computer and a network and for enforcing a security policy restricting network traffic passed between the computer and the network, wherein the computer includes unpatched software vulnerable to attack from the network and wherein the enforced security policy allows network traffic that enables the computer to obtain update patches and restricts other network traffic to protect the computer from a network-based attack while the software on the computer is being patched; and
  storing definitions identifying computer viruses locally within the portable firewall adapter, wherein the portable firewall adapter is adapted to interact with the computer to install the virus definitions onto the computer and wherein anti-virus software on the computer is adapted to utilize the virus definitions to detect computer viruses.

13. The method of claim 12, further comprising:
  storing patches for the software on the computer locally within the portable firewall adapter, wherein the portable firewall adapter is adapted to interact with the computer to install the patches onto the computer prior to the computer connecting to the network.

14. The method of claim 13, wherein the patches are stored in the portable firewall adapter contemporaneously with the portable firewall adapter being provided to an end-user of the computer.

15. The method of claim 12, wherein the portable firewall adapter is adapted to utilize a plurality of security policies, further comprising:
  selecting a security policy from among the plurality of security policies; and
  applying the selected security policy to the network traffic passing between the computer and the network.

16. The method of claim 15, wherein the security policy is selected from among the plurality of security policies responsive to the computer with which the portable firewall adapter is used.

17. A computer program product comprising:
  a non-transitory computer-readable device embedded within a portable firewall adapter, the computer-readable device having thereon computer-readable instructions for analyzing network traffic between a computer and a network, the computer readable device comprising:
    a configuration module for storing a plurality of security policies for protecting the computer from attack by malicious software on the network, the configuration module comprising a virus definitions module for storing definitions identifying computer viruses, wherein the portable firewall adapter is adapted to interact with the computer to install the virus definitions onto the computer and wherein anti-virus software on the computer is adapted to utilize the virus definitions to detect computer viruses; and
    a firewall module for enforcing a given security policy stored by the configuration module to allow network traffic that enables the computer to obtain update patches and to restrict other network traffic.

18. The computer program product of claim 17, wherein a security policy stored by the configuration module specifies a list of allowed network locations providing the update patches, and wherein the portable firewall module allows the computer to connect to only the allowed network locations in the list.

19. The computer program product of claim 17, wherein the configuration module comprises:
  a patches module for locally storing the update patches, wherein the firewall adapter is adapted to interact with the computer to install the patches onto the computer prior to the computer connecting to the network.

20. The computer program product of claim 19, wherein the configuration module is adapted to communicate with the network to obtain the patches for software and store the patches in the patches module.

21. The computer program product of claim 17, wherein the configuration module is adapted to communicate with the network to obtain the virus definitions identifying computer viruses and store the virus definitions in the virus definitions module.

22. The computer program product of claim 17, further comprising:

a computer ID module for storing identifiers associated with computers with which the portable firewall adapter is used.

23. The computer program product of claim 22, wherein the firewall module enforces a security policy selected from among the plurality of security policies stored by the configuration storage module responsive to an identifier of the computer.

* * * * *